United States Patent [19]
Steiner

[11] Patent Number: 5,586,814
[45] Date of Patent: Dec. 24, 1996

[54] BRAKING PRESSURE CONTROL DEVICE WITH MAXIMUM VEHICLE DECELERATION DURING AUTOMATIC BRAKING

[75] Inventor: Manfred Steiner, Winnenden, Germany

[73] Assignee: Mercedes-Benz AG, Germany

[21] Appl. No.: 299,009

[22] Filed: Aug. 30, 1994

[30] Foreign Application Priority Data

Aug. 30, 1993 [DE] Germany .......................... 43 29 140.6

[51] Int. Cl.[6] .............. B60T 8/60; B60T 8/40; B60T 8/48
[52] U.S. Cl. .................... 303/116.2; 303/113.1; 303/113.2; 303/113.4
[58] Field of Search ............. 303/113.1, 113.2, 303/114.3, 116.1, 116.2, DIG. 3, DIG. 4, 113.4

[56] References Cited

U.S. PATENT DOCUMENTS

| | | | |
|---|---|---|---|
| 4,755,008 | 7/1988 | Imoto et al. | 303/100 |
| 5,188,437 | 2/1993 | Willman | 303/116.2 |
| 5,236,256 | 8/1993 | Schmidt et al. | 303/116.2 |
| 5,350,225 | 9/1994 | Steiner et al. | 303/113.4 |
| 5,401,084 | 3/1995 | Volz | 303/113.4 |

FOREIGN PATENT DOCUMENTS

| | | | |
|---|---|---|---|
| 4118719 | 10/1992 | Germany | 303/116.2 |
| 4208496 | 8/1993 | Germany . | |
| 2265195 | 9/1993 | United Kingdom . | |

*Primary Examiner*—Matthew C. Graham
*Attorney, Agent, or Firm*—Evenson, McKeown, Edwards & Lenahan P.L.L.C.

[57] ABSTRACT

A braking pressure control device for a hydraulic two-circuit brake system with a pneumatic braking force amplifier and an antilock brake system (ABS) that operates on the feedback principle, in which a switching valve is provided for each brake circuit. Each switching valve is switchable from a position connecting the brake circuit with a pressure outlet of the braking device into a position that shuts off this pressure outlet from the brake circuit. The control device has a precharging control valve that is switchable from a position that shuts off this pressure outlet from the low-pressure inlet of the feedback pump into a position that connects the pressure outlet with the feedback pump, as well as an electronic control unit that processes the sensor signals that contain at least the information on the type of actuation of the brake pedal to generate the signals required for automatic full brake application for controlling the switching valves, the precharging control valves, the feedback pumps, the inlet and outlet valves of the ABS, as well as a control valve by which the drive chamber of the braking force amplifier can be vented.

7 Claims, 2 Drawing Sheets ic control unit includes sensor inputs that receive sensor output signals that contain information regarding at least one of the actuation of the brake pedal and the dynamic behavior of the motor vehicle, the electronic control unit generating signals required for automatic operation of the brake system at a high braking pressure level, for controlling the switching valves, the precharging control valves, the return pumps, and

BRAKING PRESSURE CONTROL DEVICE WITH MAXIMUM VEHICLE DECELERATION DURING AUTOMATIC BRAKING

BACKGROUND AND SUMMARY OF THE INVENTION

The present invention relates to a braking pressure control device for a motor vehicle with hydraulic multi-circuit brake systems with static brake circuits, the motor vehicle having a master cylinder as a braking device with separate pressure outlets associated with each of said brake circuits; a pneumatic braking force amplifier coupled to said master cylinder and a brake pedal coupled to said pneumatic braking force amplifier. The brake pedal actuates the master cylinder through the amplifier, this amplifier having a drive chamber movably delimited by a piston between a permanent low-pressure chamber maintained at a low pressure, whose charging with a pressure monotonically correlated with pressure on the brake pedal is controllable by which a deliberate brake application occurs. An auxiliary force valve is coupled to the amplifier and switchably causes exposure of the low-pressure chamber to a pressure equal to or greater than atmospheric pressure, this exposure causing a high actuating force sufficient for a full brake application to be deployed. An electronic control unit having an output signal coupled to the auxiliary force control valve controls the triggering of the switching of the auxiliary force control valve. The electronic control unit generates an output signal when the speed or the rate of change of the force with which the driver actuates the brake pedal exceeds a threshold value. An antilock brake system (ABS) is coupled to and acts on the individual brake circuits by feedback. The brake systems have inlet and outlet valves associated individually with the wheel brakes and are electrically controllable. Feedback pumps are individually associated with the brake circuits, these pumps being drivable electrically and having a high output pressure level. The pumps, in a pressure-reduction phase of antilock brake regulation, recycle into a main brake line of the respective brake circuit the brake fluid that has been released into a return line of the respective brake circuit.

A braking pressure control device of the above-described type according to related U.S. patent application Ser. No. 08/033,757, filed on Mar. 17, 1993, now U.S. Pat. No. 5,350,225 is intended for a vehicle with static brake circuits, each circuit having associated with it one output of a master cylinder provided as a braking device. This master cylinder is operable by a brake pedal through a pneumatic braking force amplifier. The amplifier has a drive chamber movably delimited by a piston from a low-pressure chamber kept permanently at lower pressure, by whose exposure via pedal control to a pressure monotonically correlated with the pedal force, the force amplification with which a deliberate brake application takes place can be controlled. By exposure to atmospheric pressure or to a higher pressure, produced by the switching of a solenoid valve, an actuating force that is high and sufficient for a full brake application acts on the master cylinder, can be deployed. Switching of the solenoid valve for this purpose can be triggered by an output signal from an electronic control unit that generates the output signal when the speed $\phi$ or the rate of change K of the force K with which the driver actuates the brake pedal exceeds a threshold value $\phi_S$ or $K_S$ in this respect. The vehicle is also equipped with an antilock brake system (ABS) designed to ensure dynamically stable behavior of the vehicle during a brake application, and acting on the individual brake circuits using the feedback principle. This system comprises the intake and exhaust valves associated with the individual wheel brakes and is controllable electrically. Feedback pumps are assigned individually to the brake circuits and are electrically drivable and designed for a high output pressure level. By means of the feedback pumps, in a pressure reduction phase of the antilock regulation, brake fluid released into a return line from the respective brake circuit can be fed back into its main brake line that branches off one of the pressure outlets of the brake system.

The purpose of the braking pressure control device according to the related patent application is to support automatically the driver's desire, as determined from the manner of actuation of the brake pedal, for greater vehicle deceleration in such a manner that even while the brake pedal is traveling the distance that is usually available, a relatively high braking pressure is coupled into the wheel brakes in order to activate the brake system as soon as possible. This rapid response of the brake system along with a correspondingly high increase in vehicle deceleration is also achieved, with the control point of the braking force amplifier being reached in only a short time. This "fast" response behavior of the brake system, in cases that are not uncommon, also encourages the driver not to increase further the force with which he is actuating the brake pedal, since after the control point of the braking force amplifier is reached and the brake pedal, after initially being very easy to depress, suddenly exhibits a different, harder reaction, the driver has the impression that he has exhausted the braking force and vehicle deceleration available to him. The result of such behavior on the part of the driver is that a significant portion of the actuating force in the master cylinder that can be converted into braking pressure, namely the amount that the driver could exert, is wasted as it were. This has the additional consequence that, especially in brake applications made on a dry road with good traction, the maximum possible vehicle deceleration that would result if the braking force were to be increased until the antilock brake system of the vehicle responded, is not utilized.

An object of the invention is to improve a braking pressure control device of the initially described type so that even in the event of an automatically controlled full brake application, the maximum possible vehicle deceleration values can be reliably utilized.

This and other objects are achieved by the present invention which provides in a brake control device of the initially mentioned type a separate electrically controllable switching valve for each of the brake circuits, said valve being switchable from a functional position connecting the main brake line of the respective brake circuit with the respective pressure outlet of the braking device, into a functional position shutting off the respective pressure outlet from the respective main brake line. An electrically controllable precharging control valve is provided that is switchable from a functional position shutting off the respective pressure outlet of the braking device from a low-pressure inlet of a return pump of the respective brake circuit, into a functional position connecting the respective pressure outlet with the low-pressure inlet of the respective return pump. The electronic control unit includes sensor inputs that receive sensor output signals that contain information regarding at least one of the actuation of the brake pedal and the dynamic behavior of the motor vehicle, the electronic control unit generating signals required for automatic operation of the brake system at a high braking pressure level, for controlling the switching valves, the precharging control valves, the return pumps, and the inlet and outlet valves of the antilock brake system, and the auxiliary force control valve.

According to the present invention, an electrically controllable switching valve is provided for each of the brake circuits, said valve being switchable from a functional position (its basic position) in which it connects the main brake line of the respective brake circuit with the pressure output from the master cylinder associated therewith, into a functional position that shuts off the pressure output from the main brake line, as well as an electrically controllable precharging control valve that is switchable from a functional position (its basic position) in which it shuts off the respective pressure output of the master cylinder from the low-pressure inlet of the return pump of the respective brake circuit, into a functional position that links the respective pressure output with the low-pressure inlet of the respective feedback pump, with the output pressure of the master cylinder, actuated for example by venting the drive chamber of the pneumatic braking force amplifier, being conducted as a precharging pressure to the return pumps of the antilock brake system, which can now feed brake fluid at a high output pressure level into the main brake lines of the two brake circuits, and an electronic control unit is provided that generates information on the nature of the actuation of the brake pedal and possibly information on the dynamic behavior of the vehicle, and generates the signals required for automatic operation of the brake system at a high braking pressure level for controlling the switching valves, the precharging control valves, the return pumps, and the inlet and outlet valves of the antilock brake system.

In the operating state of the brake system of the present invention in which the return pumps are utilized as pressure sources individually associated with the brake circuits, and the braking device including its braking force amplifier is utilized as their precharging pump, very high pressures can be coupled into the individual wheel brakes, which can also be adjusted by individual pulsed control of the inlet and outlet valves of the individual wheel brakes to provide individually different values. The brake system of the invention is therefore suitable for a driving-dynamics regulating operation which, depending on the situation, can require the activation of one or more wheel brakes at different pressure levels. This is especially true in certain embodiments that provide pressure sensors that are individually associated with the wheel brakes of the vehicle, whose pressure-proportional output signals can be processed by the electronic control device as actual value signals.

In addition, the brake system provided in certain embodiments is especially advantageous for driving-dynamic braking pressure regulation, and also for automatic control of full brake application operation of the brake system, since, in addition to monitoring the brake pedal position by means of a pedal position sensor, it permits additional determination of the brake-actuating behavior of the driver.

Certain embodiments of the invention provide a force-sensor device suitable for determining the driver's wishes with regard to the initiation and termination of an automatically controlled full brake application, something that is possible for example with the aid of strain gauges or piezoelectric force-sensing elements which correspond to the available prior art, and can be incorporated into the brake system without significant design modifications in the braking force amplifier or the master cylinder.

In certain advantageous embodiments, a functionally corresponding sensor arrangement is provided by using a simple microswitch that can be integrated without difficulty into the braking force amplifier.

Certain embodiments of an electronic control unit provided in the present invention permit an especially reliable and sensitive determination of the driver's wishes.

Other objects, advantages and novel features of the present invention will become apparent from the following detailed description of the invention when considered in conjunction with the accompanying drawings.

DETAILED DESCRIPTION OF THE DRAWINGS

Figure 1:
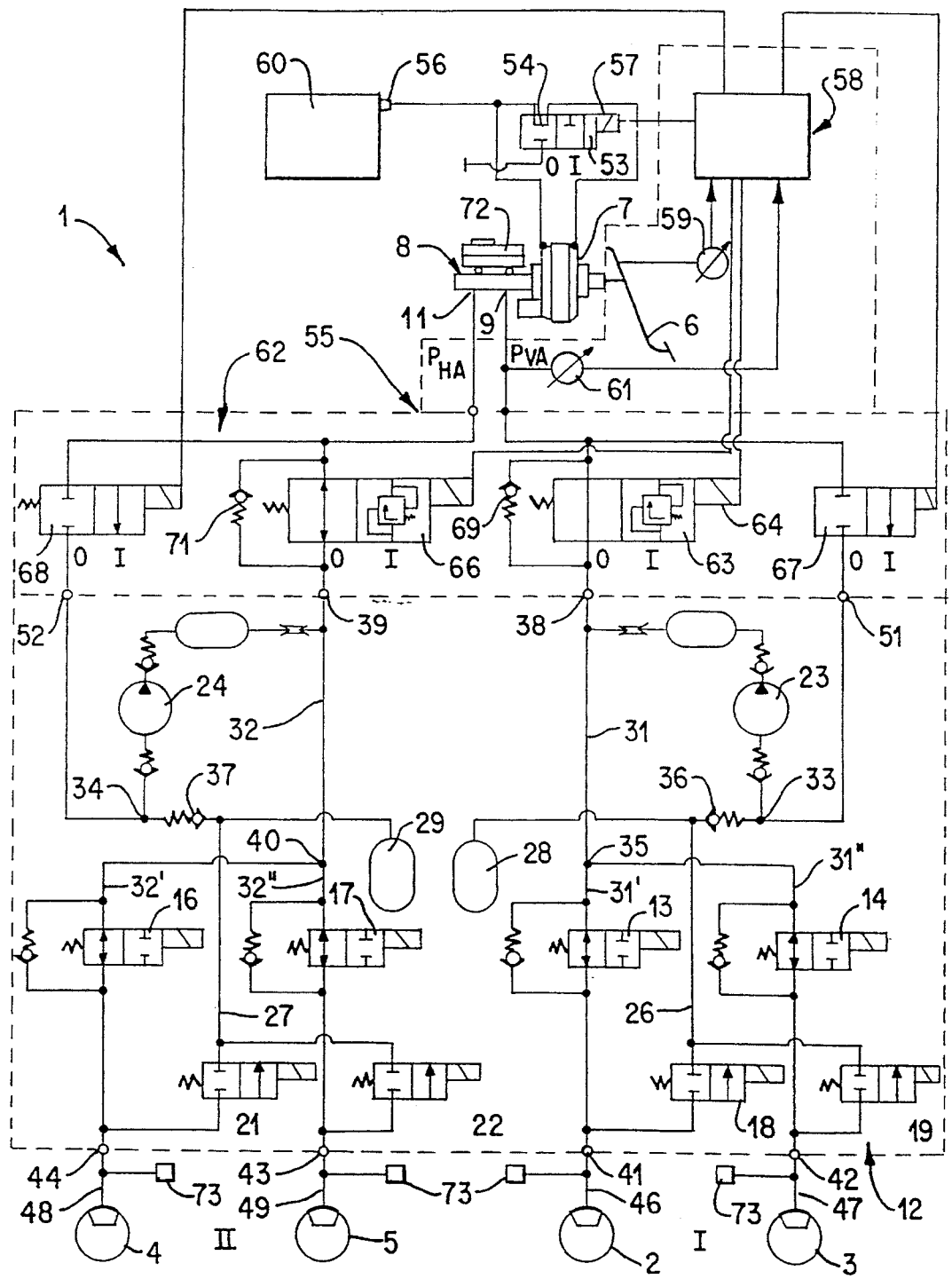
FIG. 1 shows a brake system with a braking pressure control device constructed according to an embodiment of the invention in a schematically simplified electro-hydraulic schematic diagram.

In the two-circuit brake system, shown in FIG. 1 and represented as a whole by reference numeral 1, for a motor vehicle represented thereby, a left front wheel brake 2 and a right front wheel brake 3 are combined into a front axle brake circuit I and the left rear wheel brake 4 and the right rear wheel brake 5 are combined into a rear axle brake circuit II.

The two brake circuits I and II are designed as static brake circuits, whose braking pressure supply is provided in a "normal" brake application, i.e. a deliberate brake application taking place with moderate vehicle deceleration, in which the deployment of the braking pressure is controlled exclusively by the driver by operating brake pedal 6, through a conventional tandem master cylinder 8. The brake pedal 6 actuates the tandem master cylinder 8 through a pneumatic braking force amplifier 7. The cylinder 8 has a static pressure output 9 associated with the front axle brake circuit I and a static pressure output 11 associated with the rear axle brake circuit II, to which pressures $P_{VA}$ and $P_{HA}$ of essentially the same value are provided when the master cylinder 8 is actuated.

The vehicle is equipped with an antilock brake system using a known design and operating by the feedback principle, this system being represented in the drawing by its hydraulic unit represented as a whole by reference numeral 12. The antilock brake system 12 has inlet valves 13, 14, and 16, 17 individually associated with front wheel brakes 2 and 3 and the rear wheel brakes 4 and 5, and outlet valves 18, 19 and 21, 22, likewise each associated individually with individual wheel brakes 2 to 5 as electrically controllable braking pressure regulating valves. Feedback pumps 23 and 24 of the brake system 12 are individually associated with the two brake circuits I and II, by which the brake fluid, released in a braking pressure reduction phase of antilock brake regulation from one or more of wheel brakes 2 to 5 through a return line 26 or 27 of the respective brake circuit I or II into a low-pressure reservoir 28 or 29, can be recycled into main brake line 31 or 32 of front axle brake circuit I or rear axle brake circuit II. The low-pressure inlets 33 and 34 of return pumps 23 and 24 of the two brake circuits I and II are connected to the return lines 26 and 27 and to the low-pressure reservoirs 28 and 29 of the respective brake circuits I and II through one check valve 36 or 37 each. The valves 36, 37 are urged in the opening direction by relatively higher pressure in return line 26, 27 than in the respective low-pressure inlet 33, 34 of the return pump 23, 24, and are otherwise closed.

The hydraulic unit has two supply connections each associated with one of the two brake circuits I and II, from which the internal main brake lines 31 and 32 depart. From branching locations 35 and 40, the internal brake line branches 31' and 31" or 32' and 32" branch off, these branches being connected through inlet valves 13, 14 and 16, 17 of the front wheel brakes 2 and 3 and the rear wheel brakes 4 and 5 to control outputs 41, 42 and 43, 44 of the hydraulic unit 12. Wheel brake lines 46, 47 and 48, 49 are connected to the hydraulic unit 12, as are two additional supply connections 51, 52 each of which is connected internally individually with low-pressure inlet 33 or 34 of return pump 23 or 24 of front axle brake circuit I or rear axle brake circuit II.

The structural and functional elements of the antilock brake system 12 so far described, whose electronic control unit and wheel rpm sensor are not shown for the sake of simplicity and are assumed to be known in terms of their structure and function, are also functional elements of the braking pressure control device of the present invention and represented as a whole by reference numeral 55. With the present invention, in cases in which the driver desires to produce maximum vehicle deceleration, a full brake application can be performed under automatic control in which all the wheel brakes 2 to 5 are simultaneously pressurized with a maximum possible braking pressure that is still compatible with the dynamic stability of the vehicle. Furthermore, a driving-dynamics regulation that is generally directed at the dynamic stability of the vehicle can be controlled in which, without the driver actuating the brake system 1, one or more of wheel brakes 3 to 5 of the vehicle can be pressurized with braking pressures of the same or different amounts. This is done either in order to optimize the traction behavior of the vehicle in the sense of drive/slip regulation, or in the sense of a pure driving-dynamics regulation, in which the individual wheel brakes, even the nonpowered vehicle wheel brakes, are activated in order to achieve a certain steering behavior of the vehicle.

Within the brake pressure control device 55 an electrically controllable auxiliary force control valve 53 is provided, and is associated with the braking force amplifier 7. This valve 53 has a basic position 0 in which a drive chamber 75 (FIG. 2) of the pneumatic braking force amplifier 7 provided in the usual design is connected through a through-flow path 54 that is open in this basic position 0 and exclusively connected through this path with the low-pressure source. A combustion air intake stub 56 of engine 60 forms the low-pressure source, is merely indicated schematically, and is further connected permanently to a low-pressure chamber 70 of the braking force amplifier 7.

This basic position 0 of the auxiliary force control valve 53 is associated with normal deliberate brake operation of the brake system 1, in which the driver, by actuating the brake pedal 6, controls a braking pressure in the wheel brakes 2 to 5 that is proportional to the actuating distance or force of the pedal 6.

The auxiliary force control valve 53, in the illustrated embodiment a 3/2 solenoid valve, has a switch position I, that is assumed upon excitation of its control magnet 57 by an output signal from an electronic control unit 58 of the braking pressure control device 55. In position I, the low-pressure source 56, 60 is shut off from the drive chamber 75 of the pneumatic braking force amplifier 7, but this drive chamber 75 is exposed to ambient atmospheric pressure or a higher pressure from an auxiliary pressure source, so that the master cylinder 8 is actuated so as to build up a high output pressure at its pressure outputs 9 and 11.

An output signal that causes the auxiliary force control valve 53 to switch into its switch position I is delivered by the electronic control unit 58 of braking pressure control device 55 when the driver, at the beginning of a brake application, actuates the brake pedal 6 at a rate $\phi$ that is greater than a threshold value $\phi_S$ and/or the force K with which he actuates the brake pedal 6 rises very quickly, such that the rate of change K of the actuating force exceeds a threshold value $K_S$. This occurrence can be recognized by the electronic control unit 58 from the output signals of an electronic or electromechanical pedal position sensor 59 and/or the output signals from an electronic or electromechanical pressure sensor 61 that detects the pressure at the pressure outlet 9 of the tandem master cylinder 8, associated with the front-axle brake circuit I.

An automatically controlled full brake application can be triggered by the output signals from the pedal position sensor 59, while the brake pedal 6 is still performing its free travel that is not linked to a significant pressure buildup in tandem master cylinder 8.

A control valve block designated as a whole by reference numeral 62 is provided within the braking pressure control device 55. The control valve block 62 hydraulically connects the pressure outlets 9 and 11 of the master cylinder 8 to the supply connections 38, 39 and 51, 52 of the hydraulic unit 12 of the antilock brake system (ABS). This control valve block 62 comprises a first switching valve 63 that is a 2/2-way solenoid valve, whose basic position 0 is its through-flow position, in which the pressure outlet 9 of the master cylinder 8 associated with front-axle brake circuit I, is connected with the supply connection 38 of the ABS hydraulic unit 12, from which its main brake line 31 departs. The switch position I assumed by the switching valve 63 when the control solenoid 64 is energized by an output signal from electronic control unit 58 is its blocked position, in which it also acts as a pressure-limiting valve.

A second switching valve 66 is provided that is analogous to the first switching valve 63, and has a basic position 0 that is its through-flow position. The second switching valve 66 connects the pressure outlet 11 of the tandem master cylinder 8 associated with the rear axle brake circuit II, with the supply connection 39 of the hydraulic unit 12 of ABS 12, from which the main brake line 32 of rear-axle brake circuit II branches. This second switching valve 66, in its energized position I, acts as a pressure-limiting valve. In addition, control valve block 62 has a first precharging control valve 67 associated with the front-axle brake circuit I and a second precharging control valve 68 associated with the rear-axle brake circuit II. These valves 67, 68 are 2/2-way solenoid valves that are controlled by output signals from electronic control unit 58. The precharging control valves 67 and 68 have a basic blocking position 0 and a through-flow position as their energized position I, in which the pressure outlet 9 of the master cylinder 8, associated with front-axle brake circuit I, is connected through first precharging control valve 67 with the additional supply connection 51 of the ABS hydraulic unit 12 that leads to the low-pressure inlet 33 of the return pump 23 of the front-axle brake circuit. Likewise, in position I, the pressure outlet 11 of master cylinder 8, associated with rear-axle brake circuit II, is connected through the second precharging control valve 68 with the additional supply connection 52 of ABS hydraulic unit 12 connected with the low-pressure inlet 34 of the return pump 24 of the rear-axle brake circuit II. One check valve 69 or 71 is connected in parallel with each of the switching valves 63 and 66. These check valves 69, 71 are urged in the opening direction with relatively higher pressure at the respective pressure outlets 9 and 11 of the master cylinder 8 than in the main brake lines 31 and 32 of the hydraulic unit 12 and are otherwise blocked. In brake system I, whose design and function have thus far been described, when a deliberate brake application occurs, the switching valves 63 and 66 as well as the precharging control valves 67 and 68 are in the basic positions shown. Braking pressure development is controlled by the driver by means of the brake pedal 6, but possibly modulated by the response of the antilock brake system.

In addition, via braking pressure control device 55, 58, the following functions can be achieved with brake system I:

1. Automatically controlled full brake application, "braking assistance function":

With very rapid actuation of the brake pedal 6, interpreted by the electronic control unit 58 as the driver's desire that a full brake application be made, the auxiliary force control valve 53 is initially urged into its functional position I. The drive chamber 75 of the braking force amplifier 7 is thereby vented, and the brake valve of the braking force amplifier 7 is bypassed. The drive chamber 75 is thereby exposed to full atmospheric pressure, whereupon the braking force amplifier 7 is set to its control point. The tandem master cylinder is actuated up to an outlet pressure $P_{VA}$ to $P_{HA}$, which in practice amounts to about 75% of the pressure that would result if the driver were to actuate brake pedal 6 with the force that normally would be required to reach the control point of braking force amplifier 7. Even while the outlet pressure of the tandem master cylinder 8 is coupled through the switching valves 63 and 66, that are initially still in their basic positions 0, into the main brake lines 31 and 32 of the front axle brake circuits I and II, is rising, the return pumps 23 and 24 are turned on by output signals from the electronic control unit 58. The switching valves 63 and 66 are switched simultaneously therewith or shortly thereafter into their blocking positions I, and the precharging control valves 67 and 68 are switched into their through-flow positions I, so that the tandem master cylinder 8 now operates as a charging pressure source "precharging pump" for return pumps 23 and 24, and the pumps 23, 24 serve as braking pressure sources for the front-axle brake circuit I and the rear-axle brake circuit II. The high braking pressure that can be developed by the precharging pumps 23 and 24 can be sufficiently reduced by the switching valves 63 and 66 to the tandem master cylinder 8, acting in their blocking positions II as pressure-limiting valves.

A exemplary sensor suitable for recognizing the driver's wishes after termination of an automatically controlled full brake application is a force sensor comprising a strain gauge system, not shown, whose output signal is a measure of elastic deformation, for example that which the brake pedal undergoes when actuated. It could also sense another element of the force transmission circuit through which this actuating force is transmitted to pressure rod 76 of braking force amplifier 7 that axially abuts primary piston 74 (FIG. 2) of master cylinder 8, for example a pedal plunger 77, by which the brake pedal 6 is axially supported on a reaction piston 78 of control part 79 of braking force amplifier 7. It could also sense the reaction piston 78 itself, which, according to the diagram in FIG. 2, is tensioned between the pedal plunger 77 and an elastically flexible reaction disk 81 provided to shape the amplification factor of the braking force amplifier 7.

Figure 2:
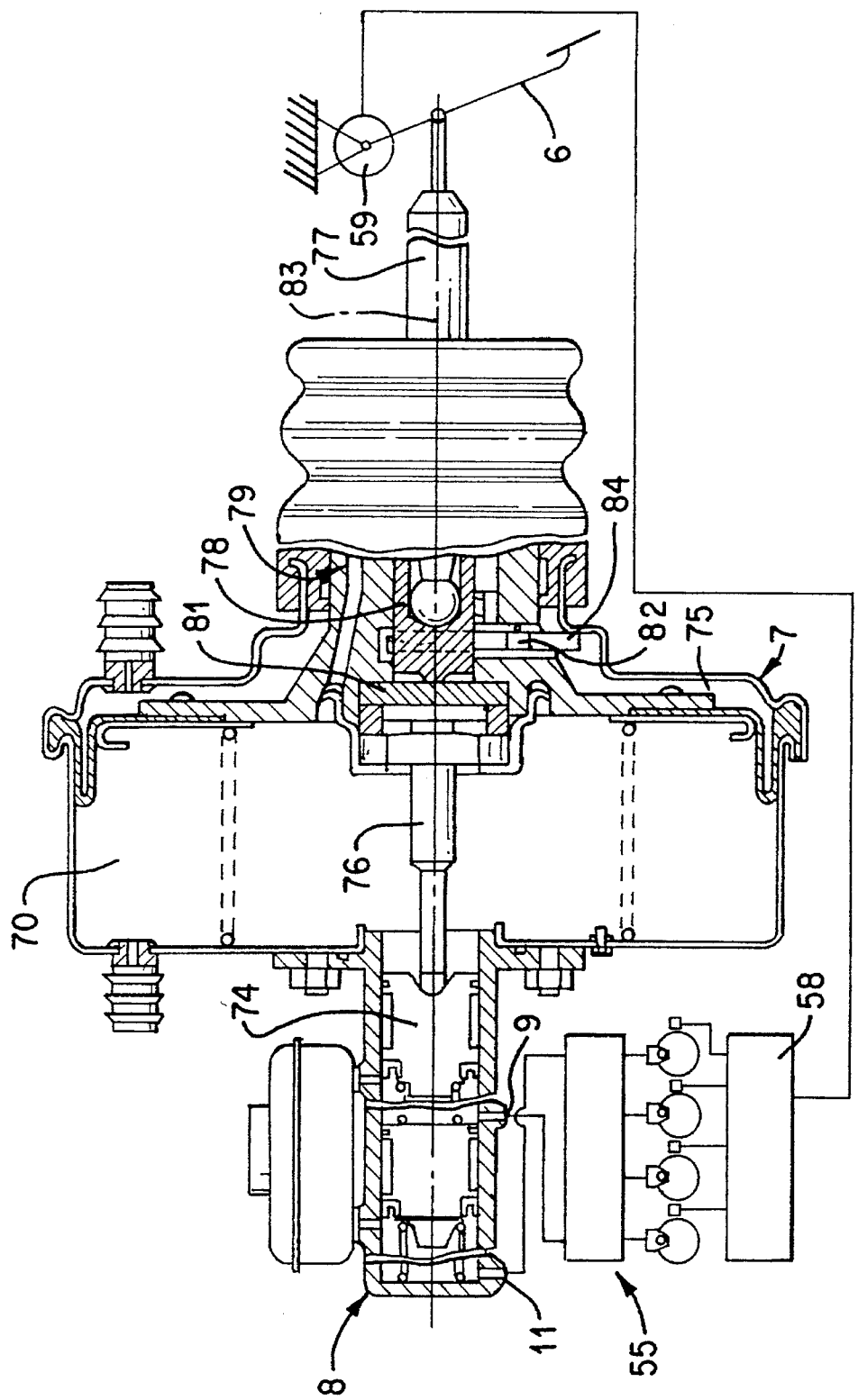
FIG. 2 shows details of a pneumatic braking force amplifier in the brake system according to FIG. 1 for actuating the master cylinder thereof, with a sensor device for recognizing the driver's wishes with regard to terminating an automatically controlled full brake application.

In the embodiment of the braking pressure control device shown in FIG. 2, a microswitch 82 is provided to recognize the driver's wishes after maintaining and interrupting an automatically controlled full brake application. This microswitch 82, depending on whether the driver is actuating the brake pedal 6 with a force that is greater than a threshold value $K_S$ or is smaller than the latter, delivers significantly different output signals or output signal combinations that are conducted constantly as information signals to the electronic control unit 58. For example, the output signal from this microswitch 82 is a high-level signal (logical 1) when the force is greater than the threshold value $K_S$ and is a low-level signal (logical 0) when this force is smaller than the threshold value.

Microswitch 82 is designed as a travel-dependent switching element in the illustrated embodiment, mounted on a cross brace 84 permanently attached to the reaction piston 78, running radially with respect to lengthwise axis 83 of braking force amplifier 7, and executing its axial displacement. The microswitch 82 responds only to the axial movement of the reaction piston 78 relative to the pressure rod 76 of the braking force amplifier 7, whose travel, because of the elastic support of the reaction piston 78 on the pressure rod 76 provided by the reaction disk 81, is a measure of the force with which the driver actuates the brake pedal 6.

If the output signal of microswitch 82 indicates that the driver wishes to end automatic full brake application, the latter is ended thereby and changed into deliberate braking in such fashion that the switching valves 63 and 64 are switched back into their basic positions 0, i.e. their through-flow positions. The precharging control valves 67 and 68 are returned to their blocking basic positions 0, and at the same time, or slightly afterward, the return pumps 23 and 24 are switched off and the auxiliary force control valve 53 is returned to its basic position 0. Return pumps 23 and 24 can also remain activated, in order to be prepared in the event of antilock brake regulation being required in the course of braking.

2. Driving-dynamics regulation—automatic activation of at least one wheel brake:

For this purpose, the auxiliary force control valve 53 is switched into its functional position I and the switching valves 63 and 66 as well as the precharging control valves 67 and 68 are switched into their blocking and through-flow positions I, and the return pumps 23 and 24 are activated. The intake valve of the wheel brake which is to be activated, for example the left front wheel brake 2, remains in its basic (open) position 0, while the intake valves 14, 16, 17 of the right front wheel brake 3 and the rear wheel brakes 4 and 5 are switched into their blocking positions I. By a pulsed control of the inlet valve 13 on the left front wheel brake 2, the braking pressure buildup in the brake 2 can be influenced in a specified manner. The pressure drop in the left front wheel brake 2 can be similarly controlled through its outlet valve 18, so that in the event of a pressure drop in one wheel brake in the front-axle brake circuit I, switching valve 63 associated therewith and its precharging control valve 67 are again switched back into their basic positions 0, namely the through-flow position of the switching valve 63 and the blocking position of the precharging control valve 67. The brake fluid drained from the wheel brake 2 can either be recycled through the open outlet valve 18, the return line 26, and the return pump 23 of the front-axle brake circuit I to the master cylinder 8 and through the latter to reservoir 72, or can flow through the open inlet valve 13 of the wheel brake 2 directly to the master cylinder 8.

The drive/slip regulation function can be similarly represented, in which the wheel brakes 4 and 5 of the driven vehicle wheels must be able to be activated individually or jointly. If, as shown, the wheel brakes 2 to 5 are each provided with a pressure sensor 73 that generates an electrical output signal characteristic of the pressure in the respective wheel brake that can be processed by means of electronic control unit 58, then during a deliberate or full brake application, the precise control of the optimum braking force distribution, for example in the sense of ideal braking force distribution between the front and rear axles, is possible in simple fashion. It is sufficient for this purpose for only one pressure sensor to be provided per brake circuit I and II, whose output signals are a measure of the braking pressure in one of front wheel brakes 2 or 3 or in one of rear wheel brakes 4 or 5, or a measure of the pressures prevailing respectively in the main brake lines 31 and 32 of front-axle brake circuit I or rear-axle brake circuit II.

An electronic control unit 58 suitable for controlling these functions can be readily designed by an individual skilled in the art and familiar with the purpose using the technology of braking pressure and braking slip regulation, so that the description of the various functions also provides a sufficient explanation of their implementation by electronic circuitry.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Braking pressure control device for a motor vehicle with hydraulic multi-circuit brake systems with static brake circuits, comprising a master cylinder constituting a braking device with separate pressure outlets associated with each of said brake circuits; a pneumatic braking force amplifier coupled to said master cylinder and a brake pedal coupled to said pneumatic braking force amplifier, the brake pedal actuating the master cylinder through said amplifier; said amplifier having a drive chamber movably delimited by a piston between a permanent low-pressure chamber maintained at a low pressure, whose charging with a pressure monotonically correlated with pressure on the brake pedal is controllable by which a deliberate brake application occurs; an auxiliary force valve coupled to the amplifier and which switchably causes exposure of the low-pressure chamber to a pressure equal to or greater than atmospheric pressure, this exposure causing a high actuating force sufficient for a full brake application to be deployed; an electronic control unit having an output signal coupled to the auxiliary force control valve to control the triggering of the switching of the auxiliary force control valve, the electronic control unit generating said output signal when the speed or the rate of change of the force with which the driver actuates the brake pedal exceeds a threshold value; an electronically controllable antilock brake system (ABS) coupled to and acting on the individual brake circuits by feedback, and having inlet and outlet valves associated individually with the wheel brakes; electrically drivable feedback pumps individually associated with the brake circuits and having a high output pressure level, wherein said pumps, in a pressure-reduction phase of antilock brake regulation resulting from the antilock brake system, recycle into a main brake line of the respective brake circuit the brake fluid released into a return line of the respective brake circuit;

a separate electrically controllable switching valve for each of the brake circuits, said valve being switchable from a functional position connecting the main brake line of the respective brake circuit with the respective pressure outlet of the braking device, into a functional position shutting off the respective pressure outlet from the respective main brake line; and electrically controllable precharging control valves associated with the respective brake circuits and operatively arranged between the braking device and the ABS such that an outlet of each precharging control valve is connected solely with a line leading to the low pressure inlet of the respective return pump switchable from a functional position shutting off the respective pressure outlet of the braking device from a low-pressure inlet of a return pump of the respective brake circuit, into a functional position connecting the respective pressure outlet with the low-pressure inlet of the respective return pump whereby the braking device-precharges the return pumps and is employable to provide slip regulation as a function of wheel speed;

wherein the electronic control unit includes sensor inputs configured to receive sensor output signals representing at least one of the actuation of the brake pedal and the dynamic behavior of the motor vehicle, the electronic control unit generating signals required for automatic operation of the brake system at a high braking pressure level, for controlling the switching valves, the precharging control valves, the return pumps and the inlet and outlet valves of the antilock brake system and the auxiliary force control valve.

2. Braking pressure control device according to claim 1, further comprising pressure sensors associated individually with wheel brakes of the brake system.

3. Braking pressure control device according to claim 1, further comprising at least one pressure sensor having an output signal that is a measure of pressure applied to one of the pressure outlets of the braking device.

4. Braking pressure control device according to claim 1, further comprising a force sensor having an output signal by which, during an automatically triggered full brake application, a driver's desire to continue and terminate the full brake application is detectable, the output signal from said sensor being a measure of deformation that occurs at a force transmission element during actuation of the brake pedal through which force transmission element the actuating force is transmitted to a pressure rod of the braking force amplifier that engages the master cylinder.

5. Braking pressure control device according to claim 1, wherein the braking force amplifier has a travel-controlled switching element that follows actuating movements of an amplifying element whose movement is coupled with that of the brake pedal, said amplifying element being supported in the engaging direction of a pedal actuating force on a force transmission element through which the actuating force amplified by the braking force amplifier is transmitted to the master cylinder, thereby undergoing changes in its position that vary with the pedal actuating force relative to the force transmission element, and delivers a signal that triggers termination of an automatic brake application or prevents initiation of an automatic brake application, when, during a brake application, a threshold value of deflection relative to the force transmission element is undershot or not reached.

6. Braking pressure control device according to claim 5, wherein the force transmission element is a pressure rod of the braking force amplifier.

7. Braking pressure control device according to claim 5, wherein the electronic control unit performs time-differentiated processing of the sensor output signals.

* * * * *